United States Patent Office 3,737,515
Patented June 5, 1973

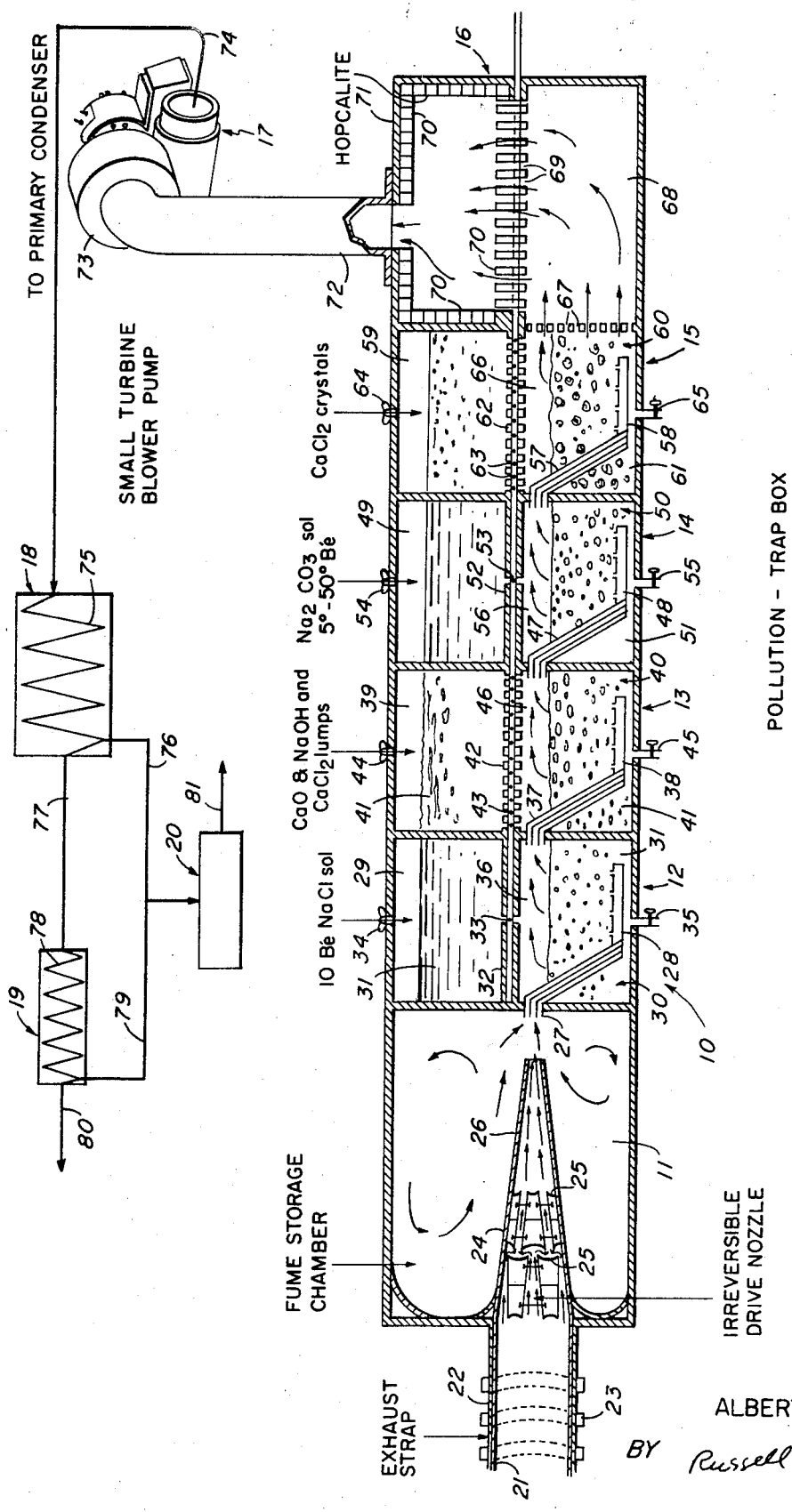

3,737,515
METHOD FOR REMOVING DELETERIOUS POLLUTANT CONSTITUENTS OF THE EXHAUST GAS OF A COMBUSTION ENGINE
Alberto E. Veloso, Quezon City, Philippines, assignor to Internationale Erfinder- und Patentanstalt, Vaduz, Liechtenstein
Filed Dec. 30, 1970, Ser. No. 102,828
Int. Cl. B01d 53/16
U.S. Cl. 423—212
6 Claims

ABSTRACT OF THE DISCLOSURE

A process for removing pollutants from the exhaust gas of an internal combustion engine comprising dispersing the gas through an aqueous wash, a particulate absorbent, a sodium carbonate solution and a desiccant. Optionally the gas may be further treated by catalytic oxidation.

BACKGROUND OF THE DISCLOSURE

Field of the invention

The present invention is concerned with the elimination of pollutant compounds from the exhaust gas of internal combustion engines, by chemical reaction or trapping of the compounds in a series of purification chambers.

BACKGROUND OF THE DISCLOSURE

Prior art

It has long been known that the exhaust gas from internal combustion engines, such as those in automobiles, contains harmful pollutant compounds, such as lead and lead oxides, nitrogen oxides, carbon monoxide and unreacted hydrocarbons. Recent efforts hav been successful in reducing the quantity of the such pollutants from the exhaust gas by one or more methods. The most common devices employed for the removal of these pollutants are either after-burners or catalytic reactors to oxidize certain of the pollutants to harmless products. In most of these devices, however, there has been no attempt efficiently to remove the lead compounds or nitrogen compounds, which have a very serious pollutant effect. Indeed, it has been well recognized that the lead compounds presently in exhaust gases poison the catalysts used to remove other of the pollutants, such as carbon monoxide.

Although these problems of lead-poisoning the catalysts used to convert the harmful pollutants of the exhaust gas to harmless products may be alleviated considerably in the next few years in the United States because of legislation, there still will remain a need for a more efficient apparatus for the removal of the pollutants of exhaust gas.

It is therefore a major objective of this invention to provide an exhaust gas purification system capable of removing virtually all of the pollutant materials in internal combustion exhaust gas. A further objective is to remove such pollutants in a simple apparatus, without the requirement of complex construction details or materials. It is still a further objective of the present invention to effect removal of the pollutant compounds by means of readily available chemicals that may be replenished at low cost and employed as useful compounds even after their use in the present apparatus. It is a still further objective to provide apparatus for the recapture and recycling of unconverted hydrocarbons or other organic compounds of the automotive fuel to a fuel chamber, for use again in the combustion engine.

BRIEF DESCRIPTION OF THE INVENTION

In accordance with the present invention, exhaust gas from the internal combustion engine is purified by passage through a series of purification chambers, each having a chemical liquid or particulate matter therein for contact with the exhaust gas in order to remove some or all of the pollutant compounds. The initial purification chamber contains an aqueous liquid, preferably water containing a small concentration of salt, such as sodium chloride. In the first purification chamber, many of the pollutant compounds are dispersed or dissolved into the aqueous liquid. The exhaust gas, containing a decreased amount of pollutants, is next passed through a second purification chamber, containing a mixture of particulate matter comprising sodium hydroxide, calcium oxide and calcium oxide and calcium chloride. In the second purification chamber, most or all of the undesirable pollutants carried over from the first chamber are removed by chemical reaction with the sodium hydroxide or calcium oxide. The exhaust gas leaving the second purification chamber is then dispersed into a solution of sodium carbonate in water, where any residual pollutant compounds are removed by dissolution or reaction with the carbonate. Finally, the exhaust gas leaving the third and last purification chamber passes through a drying chamber containing a desiccant such as calcium chloride.

The first three purification chambers effect the removal of substantially all of the harmful pollutant compounds of lead and nitrogen. Carbon monoxide may be removed in an oxidation chamber containing an oxidation catalyst, through which the exhaust gas passes in the presence of which the carbon monoxide is converted to the harmless carbon dioxide.

In preferred embodiments, after leaving the oxidation chamber, the exhaust gas is passed through a condensation chamber for the recapture of hydrocarbons and other condensible organic compounds. Preferably, such condensed compounds are recycled to a fuel chamber for use in the combustion process.

BRIEF DESCRIPTION OF THE DRAWING

The accompanying drawing shows in cross section a schematic view of the apparatus of the present system, employing purification chambers, an oxidation chamber, a condensation chamber and recycling means for the condensed compounds to the fuel chamber.

DETAILED DESCRIPTION OF THE INVENTION

The present invention successfully achieves the extraction of harmful pollutants from the exhaust gas of internal combustion engines (a) by a chemical reaction, dispersion or absorption of pollutant lead and nitrogen compounds in the three purification chambers of the apparatus; (b) by oxidation of carbon monoxide to carbon dioxide in an oxidation chamber; and (c) by condensation and recycling of hydrocarbons or organic compounds. The desired results are achieved in the present apparatus by use of readily available and inexpensive chemicals and catalyst materials, which readily are replenished from the system itself and removed when spent or depleted. In the present system, lead compounds, such as lead oxide, and nitrogen oxides are removed in the three purification chambers by contact with aqueous liquid or particulate matter and absorption, dispersion, or chemical reaction with such substances. In certain instances, constituents of the exhaust gas are caused to react with one another in the purification chambers to form harmless chemical products, which are readily removed with the spent chemical materials in the chamber.

The system of the present invention comprises in combination the following components:

(1) An exhaust gas receiving chamber connected to the exhaust outlet of an internal combustion engine, for receiving the exhaust gas and delivering it to purification chambers;

(2) A first purification chamber containing an aqueous liquid through which the exhaust gas is bubbled or otherwise dispersed and brought into contact with the liquid;

(3) A second purification chamber containing a mixture of particulate matter comprising sodium hydroxide, calcium oxide and calcium chloride, through which the exhaust gas leaving the first purification chamber is dispersed;

(4) A third purification chamber containing a sodium carbonate solution through which the exhaust gas departing from the second chamber is bubbled or otherwise dispersed;

(5) A drying chamber including a desiccant such as calcium chloride for drying the exhaust gas removed from the third purification chamber;

(6) Preferably an oxidation chamber containing an oxidation catalyst for conversion of carbon monoxide in the exhaust gas leaving the drying chamber to carbon dioxide; and (7) Preferably a condensation chamber for recapturing condensible hydrocarbons and other organic compounds from the exhaust gas stream, and recycling such condensed materials to a fuel tank for use in the combustion process.

The present invention also includes a method for removing deleterious pollutant constituents from the exhaust gas of a combustion engine, by charging the gas into a first purification chamber in dispersion into an aqueous liquid; charging the gas into a second purification chamber containing a mixture of particulate matter comprising sodium hydroxide, calcium oxide and calcium chloride, and dispersing the gas through the particulate matter; charging the gas into a third purification chamber containing a sodium carbonate solution and dispersing the gas through that solution; and finally charging the gas through a drying chamber containing desiccant particles, whereby lead and nitrogen pollutant compounds are removed from the exhaust gas into the liquid, particulate matter or solution. Preferably, the method also includes charging the exhaust gas removed from the above drying chamber into an oxidation chamber in contact with oxidation catalyst, in order to convert the carbon monoxide in the exhaust gas to carbon dioxide. Preferably, the method also includes charging the gas through a condensation chamber in order to recapture unconverted hydrocarbons or the condensible organic compounds, before recycling into a fuel chamber for use in the combustion process.

In the first purification chamber of the present apparatus, the exhaust gas is dispersed or bubbled through an aqueous liquid, preferably containing a salt, such as sodium chloride. There the lead oxide is put into dispersion, and the nitrogen oxides are dissolved to form nitrous or nitric acid. Further, carbon dioxide in the exhaust gas is also dissolved to form carbonic acid, which in turn reacts with the dispersed lead oxide to form a lead carbonate precipitate, which is readily removed when the spent aqueous fluid is discharged from the purification chamber. Also, the lead oxide reacts with the nitric acid formed by dissolution of the nitrogen dioxide, and forms lead nitrate, which is held in a solution with the sodium chloride salt until the spent aqueous liquid is removed from the chamber.

The second purification chamber contains a mixture of particulate matter, preferably, 30% sodium hydroxide, 40% calcium oxide and 30% calcium chloride. The lead oxide and nitrogen oxide further react in that chamber. The lead oxide reacts with the sodium hydroxide to form sodium plumbate; and the nitrogen oxides react to form sodium nitrite or sodium nitrate, in the presence of the calcium oxide and calcium chloride. Also, a certain amount of carbon dioxide is removed by reaction with the calcium oxide to form calcium carbonate.

The third purification chamber contains a 5–50% concentration of sodium carbonate in water. Any residual lead or nitrogen pollutants carried over from the second purification chamber are removed in the third chamber by a method similar to that employed in the first chamber, or by reaction with the sodium carbonate to form lead carbonate or sodium nitrate in solution.

The exhaust gas passing from the third purification chamber, being high in moisture, is passed through a drying chamber containing a desiccant such as calcium chloride crystals, in order to dry the exhaust gas.

Preferably, the exhaust gas leaving the drying chamber is passed through an oxidation chamber in the presence of an oxidation catalyst, in order to convert the carbon monoxide of the exhaust gas to carbon dioxide. Any of the conventional oxidation catalysts may be employed, principally, one or more metallic oxide constituents, such as the oxide combination known as hopcalite, comprising about 50% manganese dioxide, 30% copper oxide, 15% cobalt oxide and 5% silver oxide in combination. Preferably, the catalyst is in cartridge form, which may be removed and replaced when deactivated, or reactivated by heating to a high temperature in the presence of oxygen. Preferably, the catalyst is contained in a porous, perforated ceramic matrix casing.

Preferably, the exhaust gas, after removal of carbon monoxide in the oxidation chamber, is passed through a condensation chamber, provided with a vacuum pump and multi-coiled aluminum tubing by means of which hycarbons and other condensible organic compounds are recaptured. The coil tubing is packed in a box of corrugated aluminum sheets, and placed in a suitable position. It is preferable, although not essential, that a secondary condensation chamber also be used, in order to increase the efficiency of the condensation.

One of the advantages of the system described above is that when all of the chemicals are fresh, virtually all of the lead and nitrogen compounds are removed in the first purification chamber, and the second and subsequently the third purification chambers are only needed in extreme cases of pollutant discharge, or when the chemicals of the prior purification chamber(s) are saturated or depleted. Each of the chambers is capable of removing lead and nitrogen pollutants individually, and hence the three purification chambers act to supplement one another to make the entire system more reliable.

It is evident in view of the fact that three individual purification chambers are employed, each with different chemical materials therewith, that maintenance of the present system is relatively simple. All of the chemical compounds are readily available at low cost, and may be either carried in the vehicle itself, or obtained from various sales outlets. Furthermore, in a preferred embodiment of the present invention described below and shown in accompanying drawing, it is possible with minimum difficulty to provide storage chambers for each of the three chemical formulas used in the three purification chambers, and to supply fresh chemicals whenever needed. Periodically, a small sample can be taken from the sodium carbonate solution in the third purification chamber for analysis by contact with litmus papers, or any other similar acid-base indicator in order to determine whether the solution has become saturated with the removed pollutant compounds. It is within the skill of any chemist to device a very simple test to determine when the third purification chamber has become depleted or saturated with pollutant products. The oxidation catalyst, as discussed above, may be in the form of a replaceable or rechargeable canister, which also would simplify maintenance.

A preferred embodiment of the present invention is shown in the accompanying drawing, as a combination of a pollutant trap box, to be connected to the exhaust outlet of an internal combustion engine, an oxidation chamber, and a two-stage hydrocarbon condensation system, for removal of condensible hydrocarbons and other organic compounds from the exhaust gas.

Pollution trap box 10 comprises exhaust gas receiving chamber 11, first purification chamber 12, second purification chamber 13, third purification chamber 14, and drying chamber 15. At the end of pollution trap box 10 is oxidation chamber 16. Purified exhaust gas leaving oxidation chamber 16 is pumped by a small turbine blower pump 17 to primary condensation chamber 18, and secondary condensation chamber 19, wherein condensible hydrocarbons and other organic compounds are recaptured and delivered to fuel storage tank 20, for later use in the combustion engine.

Pollution trap box 10 is connected to the exhaust outlet 121 of an internal combustion engine (not shown) by means of connecting pipe 22, secured by straps 23. The exhaust gas, shown by solid arrows in the attached figure, enters exhaust gas receiving chamber 11 through irreversible drive nozzle 24, which includes baffles 25, movable to prevent any backflow of exhaust gas, for example when the engine is turned off. The exhaust gas passes through and around baffles 25, and out nozzle 26 into chamber 11.

The exhaust gas leaves chamber 11 through lines 27 into the first purification chamber 12, and is dispersed via outlets in dispersing means 28 into the chamber. The first purification chamber 12 comprises an upper chamber 29 and a lower chamber 30. Sodium chloride solution 31, preferably at a concentration of about 10° Bé., is the aqueous liquid of the first purification chamber 12 and is stored in upper chamber 29 and may be supplied through lower wall 32 via dispersing means 33 into lower chamber 30. Inlet means 34 for provision of additional aqueous liquid to upper chamber 31, and outlet means 35 for withdrawal of spent liquid from lower chamber 30, are also provided. The exhaust gas bubbles through the aqueous solution 31 contained in chamber 30 up into the vapor space 36 and through lines 37 and dispersion means 38 into the second purification chamber 13.

The second purification chamber 13 comprises upper chamber 39 and lower chamber 40, in which a particulate mixture 41 of calcium oxide, sodium hydroxide and calcium chloride is stored and used. On the bottom 42 of upper chamber 39, there are dispensing means 43 for supplying the partciulate matter 41 to the lower chamber 40. Second purification chamber 13 is also provided with inlet means 44 and outlet means 45 for supplying fresh particulate matter 41 to the upper chamber 39 and for removing the particulate matter 41 to the lower chamber 40. The exhaust gas received from the first purification chamber 12 is dispersed through the particulate matter 41 in lower chamber 40, up into the vapor space 46, and leaves the second purification chamber 13 via lines 47 and dispersion means 48 into the third purification chamber 14.

The third purification chamber 14 comprises an upper chamber 49 and a lower chamber 50. The purification chemical 51 in the third purification chamber 14 is a 5–50° Bé. solution of sodium carbonate. On the bottom 52 of upper chamber 49 is dispensing means 53 for the replenishment of the sodium carbonate solution into lower chamber 50, as desired. Third purification chamber 14 also contains an inlet means 54 for fresh material, and an outlet 55 for depleted material. Outlet 55 may also be employed to obtain a sample to determine when the chemicals of the pollution trap box have become saturated with the exhaust gas pollutants. The exhaust gas from the second purification chamber 13 exits via lines 47 and dispersion means 48 and bubbles through sodium carbonate solution 51 into vapor space 56 and exits via lines 57 through drying chamber 15.

Drying chamber 15 contains a dispersion means 58, an upper chamber 59 and lower chamber 60, similar to the component of the three purification chambers 12–14. Upper chamber 59 and lower chamber 60 contain calcium chloride desiccant 61 for drying the exhaust gas entering chamber 60 via dispersion means 58. On the bottom 62 of upper chamber 59, there are dispensing means 63 for the supply of fresh calcium chloride crystals 61 to the lower chamber 60, as required. Upper chamber 59 is provided with inlet 64 for the supply of fresh crystals 61, and lower chamber 60 is provided with outlet 65 for withdrawal of spent crystals 61. The exhaust gas passes through lines 57 and dispersion means 58, and is dried by the calcium chloride crystals 61, and passes into vapor space 66 and through outlets 67 into the surge chamber 68, located immediately below oxidation chamber 16.

The exhaust gas enters oxidation chamber 16 through inlets 69 and contacts the oxidation catalyst which is held in a porous ceramic matrix in modules 70, held in place by oxidation chamber 71. Upon leaving oxidation chamber 16 the exhaust gas, being essentially purified by removal of lead and nitrogen compounds and by oxidation of carbon monoxide to carbon dioxide, leaves via line 72, and is compressed by small turbine blower pump 73, in order to drive the exhaust gas to primary condenser 18 via line 74. Primary condenser 18 contains suitable aluminum condenser coiling 75, for the condensation of hydrocarbons and other condensible organic materials. The condensed compounds are removed from primary condenser 18 via outlet line 76 to fuel storage 20, while the remaining exhaust gas is transferred by line 77 to secondary condensation chamber 19, also having suitable condensation coils 78. The secondary condensation products are removed from condenser 19 via line 79 to fuel storage tank 20, while the uncondensed exhaust gas is discharged into the atmosphere via line 80. The condensed hydrocarbons and other compounds retained in the fuel storage tank 20 may be recycled via line 81 to the main fuel storage tank or directly to the internal combustion engine, not shown.

The preferred embodiment shown in the figure described above, is not intended as a limitation upon the invention described herein, but only as illustrative of apparatus useful in the invention. It will be within the skill of those in the art to modify the above device in order to meet the needs of a particular situation or to achieve slightly different objectives. For example, it is possible to have as an oxidation catalyst, solid particulate matter or even fluidized matter, depending upon the preferences of those employing the invention. Similarly, the oxidation catalyst chamber can be located on the downstream side of the blower pump, or an additional blower pump could be located either between the exhaust gas outlet and the pollution trap box, or after the condensation chambers. Alternative means of supplying the various fresh chemicals to the purification chambers may also be devised by those skilled in the art. Moreover, means may be devised for the reactivation of the oxidation catalyst, either in place in the oxidation chamber, or by removal of the catalyst, in the form of particulate matter or a porous, ceramic, solid canister, for that purpose. Similarly, alternative means of dispersing the exhaust gas into the various purification liquids are readily within the skill of the art, such as the use of various packings in the liquids in order to improve dispersion of the exhaust gas into those chemicals. It is intended that all these various modifications, as well as other modifications, not specifically referred to herein, shall be included within the reasonable scope of the invention, as defined by the claims that follow.

I claim:

1. A method for removing deleterious pollutant constituents of the exhaust gas of a combustion engine, which comprises: Dispersing gas through an aqueous liquid; thereafter dispersing said gas through a mixture of particulate matter comprising sodium hydroxide, calcium oxide and calcium chloride; thereafter dispersing said gas through a sodium carbonate solution; and thereafter dispersing said gas through desiccant particles, whereby pollutant lead and nitrogen compounds are removed from said gas into said liquid, particulate matter or solution.

2. The method of claim 1, wherein said gas after dispersal through said desiccant particles is contacted with an oxidation catalyst, whereby pollutant carbon monoxide is removed from said gas by oxidation to carbon dioxide.

3. The method of claim 2, wherein said gas is cooled after contact with said oxidation catalyst by passage through a condensing chamber, whereby pollutant hydrocarbons and other condensible organic compounds are removed from said gas by condensation.

4. The method of claim 3, wherein condensed hydrocarbons and other compounds exiting said condensing chamber are recycled to a fuel chamber.

5. The method of claim 1, wherein said gas is cooled after dispersal through said desiccant particles by passage through a condensing chamber, whereby pollutant hydrocarbons and other condensible organic compounds are removed from said gas by condensation.

6. The method of claim 5, wherein condensed hydrocarbons and other compounds exiting said condensing chamber are recycled to a fuel chamber.

References Cited

UNITED STATES PATENTS

| 1,422,211 | 7/1922 | Lamb | 23—2 E |
| 1,432,351 | 10/1922 | McGahan | 23—2 E |
| 1,843,999 | 2/1932 | White | 23—2 E |
| 3,476,524 | 11/1969 | Burke | 23—2 E X |
| 3,563,029 | 2/1971 | Lowes | 23—2 E X |

FOREIGN PATENTS

| 17,580 | 1908 | England | 23—2 E |

GEORGE O. PETERS, Primary Examiner